(12) United States Patent
Gourlay et al.

(10) Patent No.: US 7,251,998 B2
(45) Date of Patent: Aug. 7, 2007

(54) LIQUID MEASUREMENT SYSTEM HAVING A PLURALITY OF DIFFERENTIAL PRESSURE PROBES

(75) Inventors: Robert D. Gourlay, Northridge, CA (US); Steven C. Williams, Rancho Palos Verdes, CA (US); Daniel L. Pagan, North Hills, CA (US)

(73) Assignee: BAE Systems Information And Electronic Systems Integration Inc., Nashua, NH (US)

( * ) Notice: Subject to any disclaimer, the term of this patent is extended or adjusted under 35 U.S.C. 154(b) by 167 days.

(21) Appl. No.: 10/908,768

(22) Filed: May 25, 2005

(65) Prior Publication Data

US 2006/0266111 A1 Nov. 30, 2006

(51) Int. Cl.
*G01F 23/00* (2006.01)
(52) U.S. Cl. ........................... 73/299; 73/290 R
(58) Field of Classification Search ........... 73/299, 73/290 R
See application file for complete search history.

(56) References Cited

U.S. PATENT DOCUMENTS

| | | | |
|---|---|---|---|
| 4,336,820 A | 6/1982 | Jorgensen et al. | 137/100 |
| 4,393,705 A * | 7/1983 | Eidschun | 73/439 |
| 5,005,408 A * | 4/1991 | Glassey | 73/301 |
| 5,138,559 A | 8/1992 | Kuehl et al. | 364/509 |
| 5,163,324 A * | 11/1992 | Stewart | 73/302 |
| 5,309,764 A * | 5/1994 | Waldrop et al. | 73/302 |
| 5,351,725 A * | 10/1994 | Suthergreen et al. | 141/1 |
| 5,518,025 A | 5/1996 | Futa, Jr. et al. | 137/468 |
| 6,220,091 B1 * | 4/2001 | Chen et al. | 73/302 |
| 6,453,741 B1 | 9/2002 | Beck, II | 73/313 |
| 6,577,960 B1 | 6/2003 | Rabelo et al. | 702/55 |
| 6,601,449 B1 * | 8/2003 | Jones et al. | 73/299 |
| 6,647,781 B2 * | 11/2003 | Su | 73/299 |
| 6,666,085 B1 | 12/2003 | Lowe | 73/299 |
| 6,715,348 B2 * | 4/2004 | Mokuo | 73/299 |

* cited by examiner

*Primary Examiner*—Hezron Williams
*Assistant Examiner*—Rodney Frank
(74) *Attorney, Agent, or Firm*—Jerry Turner Sewell (57) ABSTRACT

The weight of liquid in a tank subject to tilting is determined by measuring differences in air pressure in the ullage (the empty volume of the tank above the level of the liquid) and the air pressure produced by the weight of the liquid at the bottom of the tank. The pressures at the bottom of the tank are measured in a plurality of locations, and the differential pressures are combined to compensate for changes in the depth of the liquid when the tank is not level (e.g., when the tank is in an aircraft flying at an attitude other than straight and level). The electronics to measure the pressure and to process the pressure measurements are located remotely form the tanks, thus eliminating the possibility of ignition caused by the electronics when the liquid is fuel or other flammable liquid.

6 Claims, 5 Drawing Sheets

LIQUID MEASUREMENT SYSTEM HAVING A PLURALITY OF DIFFERENTIAL PRESSURE PROBES

BACKGROUND OF THE INVENTION

1. Field of the Invention

The present invention is related to the measurement of liquid in a tank that is subject to tilting, and, more particularly, is related to the measurement of the weight of the liquid in the tank by determining differences in pressures at multiple locations in the tank.

2. Description of the Related Art

The measurement of the fuel remaining in the fuel tanks of an aircraft is highly important in order to assure that an aircraft is not flown beyond the limits of the available fuel. Fuel measurement techniques have evolved from the original method of inserting a rod into the tank prior to a flight. A current industry standard for measuring fuel uses capacitive probes, which measure the height of the fuel in a tank by measuring the change in capacitance of concentric tubes. The principle behind this approach is that changing fuel levels change the dielectric constant between the concentric tubes. In particular, a higher fuel level causes a greater capacitance, and a lower fuel causes a lower capacitance. The value of the capacitance of the concentric tubes is very small (e.g., on the order of 50 to 100 picofarads). Therefore, an accurate measurement of such a small capacitance is challenging, especially, since the stray wiring capacitance can far exceed 100 picofarads. Thus, capacitive fuel probes are very expensive and may cost in a range of $600-$2,000 per probe. Furthermore, multiple probes may be required in each tank. Since the capacitive probes are operated electronically, a portion of the electronics are typically located in the fuel tanks, which may present a risk of explosion. Accordingly, a need exists for simpler, safer and less expensive fuel probes, which provide accurate measurements of fuel during aircraft flight.

SUMMARY OF THE INVENTION

The weight of liquid in a tank that is subject to tilting is determined by measuring differences between the air pressure in the ullage (the empty volume of the tank above the level of the liquid) and the air pressure produced by the weight of the liquid at the bottom of the tank. The pressures at the bottom of the tank are measured in a plurality of locations using differential pressure transducers, and the differential pressures are used to determine the quantity of liquid remaining in the tank. The system determines the liquid quantity even when the tank is tilted. For example, the quantity of liquid remaining in a tank of an aircraft is determined when the aircraft is at an attitude other than straight and level flying. The electronics to measure the pressure and to process the pressure measurements are located remotely from the tank, thus eliminating the possibility of ignition caused by the electronics when the liquid is aviation fuel or another flammable material.

The electronics system that measures the pressures includes a differential pressure transducer and an analog-to-digital (A/D) converter module with a serial data output. No electronic components are located in the tank.

Unlike the industry standard capacitive probes, which measure the height of the liquid, the systems and methods described herein determine the weight of the liquid in a tank by measuring the pressure caused by the weight of the liquid at a plurality of locations in the tank. Each measurement probe is inserted so that an end proximate to the bottom of the tank is affected by the pressure at the bottom of the tank caused by the weight of the liquid above the end of the probe. The pressure at the bottom of the tank is measured differentially with respect to a probe located in the ullage. Since the ullage probe measures a pressure that is common to the tank, the differential pressure accurately represents the pressure caused by the weight of the liquid.

A plurality of measurement probes are located in each tank to compensate for changes in the attitude (e.g., tilting) of the tank. For example, the tank may be tilted by movement of the aircraft (e.g., changes in elevation (pitch), bank and yaw) or by being positioned on an uneven support structure or surface. The pressure measurements from the multiple probes in each tank are combined to account for the tilting of the tank issue to eliminate the need to independently measure the tilt angle of the tank.

In preferred embodiments, an additional probe is included to independently determine when a tank is approaching an empty state. The end of the additional probe does not extend to the bottom of the tank. Rather, the location of the end of the additional probe is selected to be at a height above the bottom of the tank. The height is selected such that when the level of the liquid in the tank decreases sufficiently that the ullage expands to expose the end of the additional probe, the additional probe also measures common pressure of the tank. Since the pressure applied to the additional probe is measured differentially with respect to the common probe, the differential pressure is zero. The measurement of zero differential pressure by the additional probe is advantageously used to activate a warning indication that the liquid level in the tank is approaching empty. The level of the end of the additional probe can be set to a desired percentage of the maximum liquid height in accordance with a desired safety factor (e.g., in a range from 5-10 percent of the maximum capacity of the tank).

The differential pressure probes described herein are less costly than capacitive measurement probes. Furthermore, no electronics are located in the tanks. The system uses pressure sensors which are highly accurate. The combination of the accurate pressure sensors and averaging of the differential measurements from the plurality of probes enables the system to accurately determine the liquid weight. The measurement probes are lightweight and are constructed of materials that will not damage the tanks in the event of a crash or a hard landing. The differential probes are easily configured for different tank sizes and shapes. The differential probes work with all liquid types and do not require temperature compensation. The multiple probes enable compensation for the tilt angle of the tank. The probes are simple to install and easy to maintain and repair. Since no wiring in the tanks is required, the probes are immune to lightning and electromagnetic interference (EMI) and are thus particularly suitable for use in tanks containing fuel or other flammable materials.

BRIEF DESCRIPTION OF THE DRAWINGS

Certain embodiments in accordance with the present invention are described below in connection with the accompanying drawing figures in which.

DETAILED DESCRIPTION OF THE PREFERRED EMBODIMENTS

Figure 1:
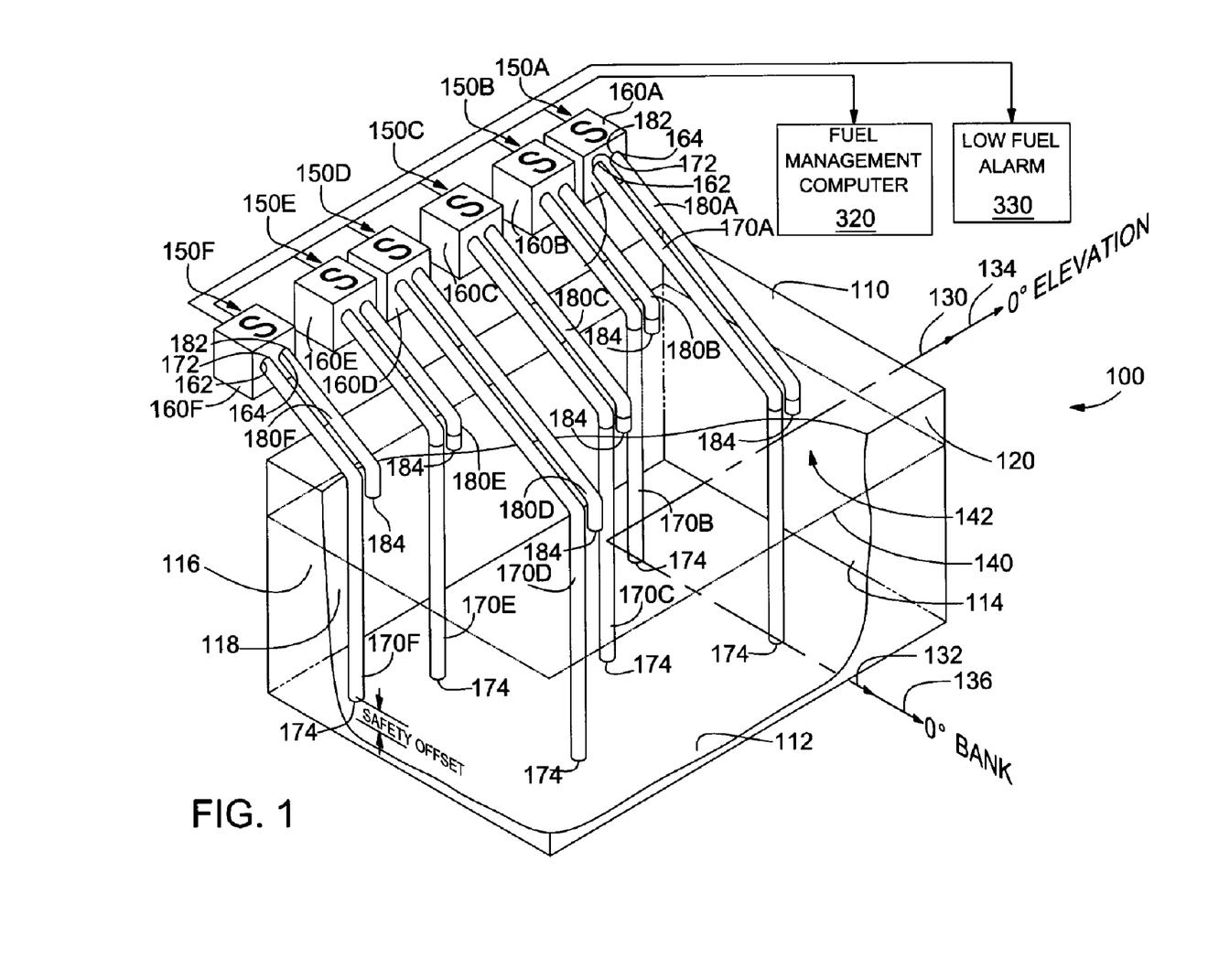
FIG. 1 is a perspective illustration of a simplified embodiment of a tank containing a liquid, wherein a portion of the tank removed to show a plurality of pressure measurement probes positioned within the tank, and wherein an upper surface of the liquid is represented by a dashed and dotted line.

FIG. 1 illustrates a tank 100 that may be used for transporting liquid in an aircraft or other machinery subject to movement. For example, the tank 100 may be a fuel tank located within the fuselage or a wing of an aircraft or it may be located within a ground transportation vehicle. In the following description, the tank 100 is located in an aircraft (not shown). Although described herein with respect to the fuel tanks of an aircraft, the invention may advantageously be embodied in other systems for measuring fuel in environments where the tank containing the fuel is subject to tilting. The invention may also be embodied in systems for measuring other liquids, such as, for example, the fire suppression liquids (e.g., water) carried in tanks of firefighting equipment.

The tank 100 may have many different configurations in order to conform the tank to the structure of the aircraft or other environment in which the tank is located. For example, the tank 100 may have an irregular shape that conforms to the airfoil and taper of an aircraft wing. In FIG. 1, the tank 100 is illustrated as a rectangular parallelepiped (e.g., a conventional box-shaped enclosure) having an upper surface 110, a lower surface 112, a forward wall 114, an aft wall 116, a left wall 118 and a right wall 120. Although the lower surface 112 is shown as a continuous plane, it should be understood that the lower surface 112 may include one or more drains (not shown) so that liquid can be removed from the tank 100. Similarly, the upper surface 110 or one of the other surfaces may include ports (not shown) for adding liquid and for venting vapors.

As illustrated in FIG. 1, the tank 100 is positioned within the aircraft so that the tank 100 is generally level when the aircraft is flying straight and level (e.g., the aircraft is not banking and has a neutral pitch attitude). A first centerline 130 is positioned parallel to the upper surface 110 and the lower surface 112 and is perpendicular to the forward surface 114. The first centerline 130 points in the direction of the forward motion of the aircraft. A second centerline 132 is also positioned parallel to the upper surface 110 and the lower surface 112. The second centerline 132 is orthogonal to the first centerline 130 and is perpendicular to the right surface 120. The second centerline 132 points in a direction perpendicular to the direction of travel of the aircraft and generally points in the direction of the right wing of the aircraft. In FIG. 1, the first centerline 130 and the second centerline 132 are parallel to the earth's surface and represent the orientation of the tank 100 for 0° elevation (pitch) and 0° bank. Thus, the first centerline 130 is superimposed on a 0° elevation line 134, and the second centerline 132 is superimposed on a 0° bank line 136. The 0° elevation line 134 and the 0° bank line 136 are reference lines that define a horizontal plane parallel to the earth's surface.

As further shown in FIG. 1, a dashed and dotted line represents the boundary of the upper surface 140 of the liquid in the tank 100 for a condition when the tank 100 contains approximately 75 percent of a maximum capacity. As illustrated for the embodiment of FIG. 1, during straight and level flight, the upper surface 140 of the liquid in the tank 100 is substantially parallel to the upper surface 110. Thus, for the illustrated embodiment having a flat bottom surface 112, the liquid has a substantially uniform depth from the upper surface 140 of the liquid to the bottom surface 112 of the tank 100. In other embodiments (not shown), the bottom surface 112 may be contoured or have an irregular depth. The unfilled portion of the tank 100 above the liquid level 140 and below the upper surface 110 is the ullage 142. The volume of the ullage 142 increases as the quantity of the liquid in the tank decreases.

In the illustrated embodiment, the liquid in the tank 100 is measured by a first differential pressure probe assembly 150A, a second differential pressure probe assembly 150B, a third differential pressure probe assembly 150C, a fourth differential pressure probe assembly 150D, a fifth differential pressure probe assembly 150E and a sixth differential pressure probe assembly 150F. Except as described below with respect to the sixth probe assembly 150F, the six probe assemblies 150A-F are substantially similar and are described accordingly. Although described herein with respect to six differential pressure probe assemblies 150A-F, other tank configurations may require fewer or more differential pressure probes. For example, if a particular tank has irregular upper and lower surfaces to accommodate the contour of a wing or to conform to other requirements, additional differential pressure probes may be advantageously used.

Each of the differential pressure probe assemblies 150A-F comprises a respective differential pressure sensor 160A-F (labeled "S" in FIG. 1). The pressure sensors 160A-F generate output signals, which, in the illustrated embodiment, are communicated to a fuel management computer 320 (described below in connection with FIG. 3). The pressure sensor 160F for the pressure probe assembly 150F advantageously generates a second output signal, which is communicated to a low fuel alarm 330 (described below in connection with FIG. 4).

Each differential pressure sensor 160A-F has a first port 162 and a second port 164. The numeric indicators for the first port 162 and the second port are shown only for the first sensor 160A and the sixth sensor 160F in FIG. 1. Each pressure probe assembly 150A-F includes a respective measurement probe configured as a respective measurement tube 170A-F and a respective reference probe configured as a respective reference tube 180A-F. As indicated for the measurement probes 170A and 170F, each measurement tube has a first end 172 coupled to the respective first port 162 of the respective sensor 160. Each measurement tube 170A-F passes through the upper surface 110 of the tank 100 and extends toward the bottom surface 112. A second end 174 of each of the measurement tubes 170A-F is positioned proximate to the bottom surface 112. The tank 100 may advantageously include structures (not shown) to retain the second ends 174 of the measurement tubes 170A-F in fixed positions with respect to the bottom surface 112. The second ends 174 of the measurement tubes 170A-F are open and are exposed to the pressure caused by the weight of the liquid above the second ends 174, which corresponds to the depth of the liquid. Thus, the measurement tubes 170A-F communicate the pressure proximate to the bottom surface 112 of the tank 100 to the first port 162 of the sensor 160.

As illustrated in FIG. 1, the lengths of the measurement tubes 170A-E coupled to the first through fifth differential pressure sensors 160A-E are selected so that the respective second ends 174 are positioned close to the bottom surface 112 of the tank 100 so that the second ends 174 are immersed in the liquid until the tank 100 is substantially empty. The length of the measurement tube 170F coupled to the sixth pressure sensor 160F is selected so that the second end 174 of the tube 170F is offset from the bottom surface 112 by a selected distance, shown as the safety offset in FIG. 1. The purpose for the safety offset is discussed below in connection with FIG. 3.

As indicated for the reference probes 180A and 180F, each of the reference tubes 180A-F has a respective first end 182 coupled to the second port 164 of the sensor 160. The reference tubes 180A-F also pass through the upper surface 110 of the tank 100; however, the reference tubes 180A-F extend only a short distance into the tank 100. In particular, a respective second end 184 of each reference 180A-F opens into the ullage 142 proximate the upper surface 110. Thus, the reference tubes 180A-F transfer the pressure in the ullage 142 of the tank 100 to the second ports 164 of the sensors 160A-F. In an unpressurized tank, the pressure in the ullage 142 is generally equal to the ambient pressure of the atmosphere at the altitude of the aircraft. In a pressurized tank, the pressure in the ullage is the pressure applied to the tank by a pressure source (not shown). In another embodiment (not shown), the plurality of reference tubes 180A-F may be replaced by a single reference tube that provides a common reference pressure to the second ports 164 of all of the sensors 160.

In FIG. 1, the measurement tubes 170A-F and the reference tubes 180A-F are shown as continuous tubes from the respective first ends 172, 182 at the sensors 160A-F to the respective second ends 174, 184 in the tank 100. In certain embodiments, the portions of the tubes within the tank 100 are advantageously fixed within the tank 100, and the external portions of the tubes 170, 180 are coupled to the internal portions by couplers or other suitable interconnection devices (not shown).

Figure 3:
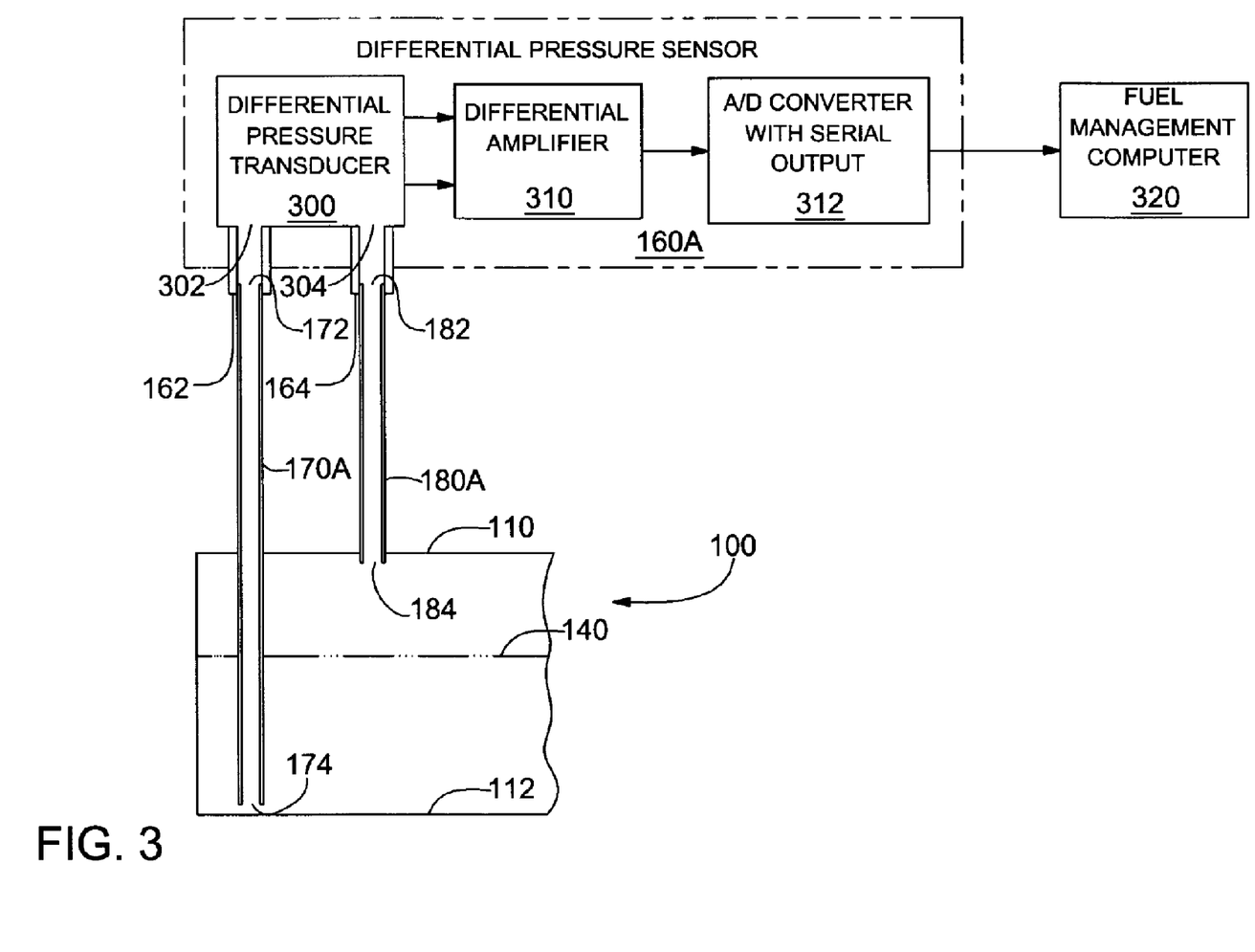
FIG. 3 illustrates a block diagram of an exemplary probe, including a differential pressure sensor, a differential amplifier, and an analog-to-digital (A/D) converter.

FIG. 3 illustrates a block diagram of the differential pressure sensor 160A. In the illustrated embodiment, the second through fifth differential pressure sensors 160B-E are substantially similar to the first differential pressure sensor 160A and are also represented by FIG. 3. The sixth differential pressure sensor 160F includes an additional function and is described below with respect to FIG. 4.

The first differential pressure sensor 160A comprises a differential pressure transducer 300. The transducer measures a difference between the pressures applied to two input ports. For example, as shown in FIG. 3, the transducer 300 generates signals responsive to pressures at a first input 302 and a second input 304. A differential amplifier 310 receives the signals from the transducer 300 and produces an analog output signal representing a difference between the pressures on the two inputs 302, 304. The analog output signal from the amplifier 310 is applied as an analog input to an analog-to-digital (A/D) converter 312. The A/D converter 312 produces an output signal that represents the measured pressure differential. In a particularly preferred embodiment, the output signal from the differential pressure sensor 160A is a serial output signal. In certain advantageous embodiments, the transducer 300 comprises a pair of absolute pressure sensors, such as, for example, ported MPX4250AP pressure sensors available from Motorola, Inc., which produce output voltages in a range from 0 to approximately 4.7 volts in response to pressures from 0 to 250 kilopascals (kPa). One sensor in the pair produces an output voltage that represents the pressure at the first input 302, and the other sensor in the pair produces an output voltage that represents the pressure at the second input 304. The analog output of the differential amplifier 310 is responsive to a difference between the two voltages. Other pressure sensors can also be used. For example, sensors having different pressure measurement ranges may be used to accommodate different ranges of liquid depths in the tank 100. In an exemplary embodiment, the A/D converter 312 comprises a Sigma-Delta A/D converter, such as, for example, an AD7715 A/D converter available from Analog Devices, which produces a serial output signal representing the digitized value of the analog signal from the differential amplifier 310. Other types of A/D converters may also be used.

As further shown in FIG. 3, the serial output signal from the differential pressure sensor 160A is provided as an input signal to the fuel management computer 320, which is advantageously located in the cockpit of the aircraft or in an electronics bay. The operation of the fuel management computer 320 with respect to the serial output signal from the differential pressure sensor 160A is described below with respect to FIG. 5.

The first input 302 of the differential pressure transducer 300 is coupled to the first end 172 of the measurement tube 170A via the first port 162. The second input 304 of the transducer 300 is coupled to the first end 182 of the reference tube 180A via the second port 164. Thus, the pressure transducer 300 receives a first pressure P1 from the bottom 112 of the tank 100 at the second end 174 of the measurement tube 170A and receives a second pressure P2 from the ullage 142 of the tank 100 at the second end 184 of the reference tube 180A. The first pressure P1 is the pressure caused by the weight of the liquid above the second end 174 of the measurement tube 170A plus the pressure in the ullage 142. Thus, by measuring the differential pressure (e.g., P2-P1), the common pressure in the ullage 142 is canceled, and the output signal produced by the transducer 300 represents the pressure caused by the weight of the liquid above the second end 174 of the measurement tube 170A.

The weight of the liquid is directly proportional to the height of the liquid surface 140 above the second end 174 of a measurement tube 170-F. Accordingly, the output signal generated by each transducer 300 represents the height of the liquid surface 140 above the second end 174 of the respective measurement tube 170A-E. During straight and level flight, the liquid depth corresponds to the percentage of liquid in the tank 100. As the level of the liquid decreases, the differential pressure sensed by each transducer 300 decreases as the weight of the liquid above the second ends 174 of the respective measurement tubes 170A-F decreases. Accordingly, the quantity of liquid remaining in the tank 100 is readily determined by calibrating the measured pressures to the quantity of liquid.

The six pressure sensors 150A-F are substantially similar; however, as discussed above with respect to FIG. 1, the position of the second end 174 of the measurement tube 170F of the sixth pressure sensor 150F is positioned farther from the bottom surface 112 than the respective positions of the second ends 174 of the respective measurement tubes 170A-E of the other five sensors 150A-E. In particular, the measurement tube 170F is truncated so that the second end 174 is located at a height above the bottom surface 112 that is selected to cause an empty tank indication when approximately 5-10 percent of the maximum liquid weight remains in the tank. The height of the second end 174 of the measurement tube 170F is identified as the safety offset in FIG. 1. As the liquid level in the tank 100 decreases during operation of the aircraft, the second end 174 of the measurement tube 170F will be exposed to the ullage 142 before the second ends 174 of the other measurement tubes 170A-E. When this condition occurs, the second end 174 of the measurement tube 170F and the second end 184 of the reference tube 180F are exposed to substantially the same pressure.

Figure 4:
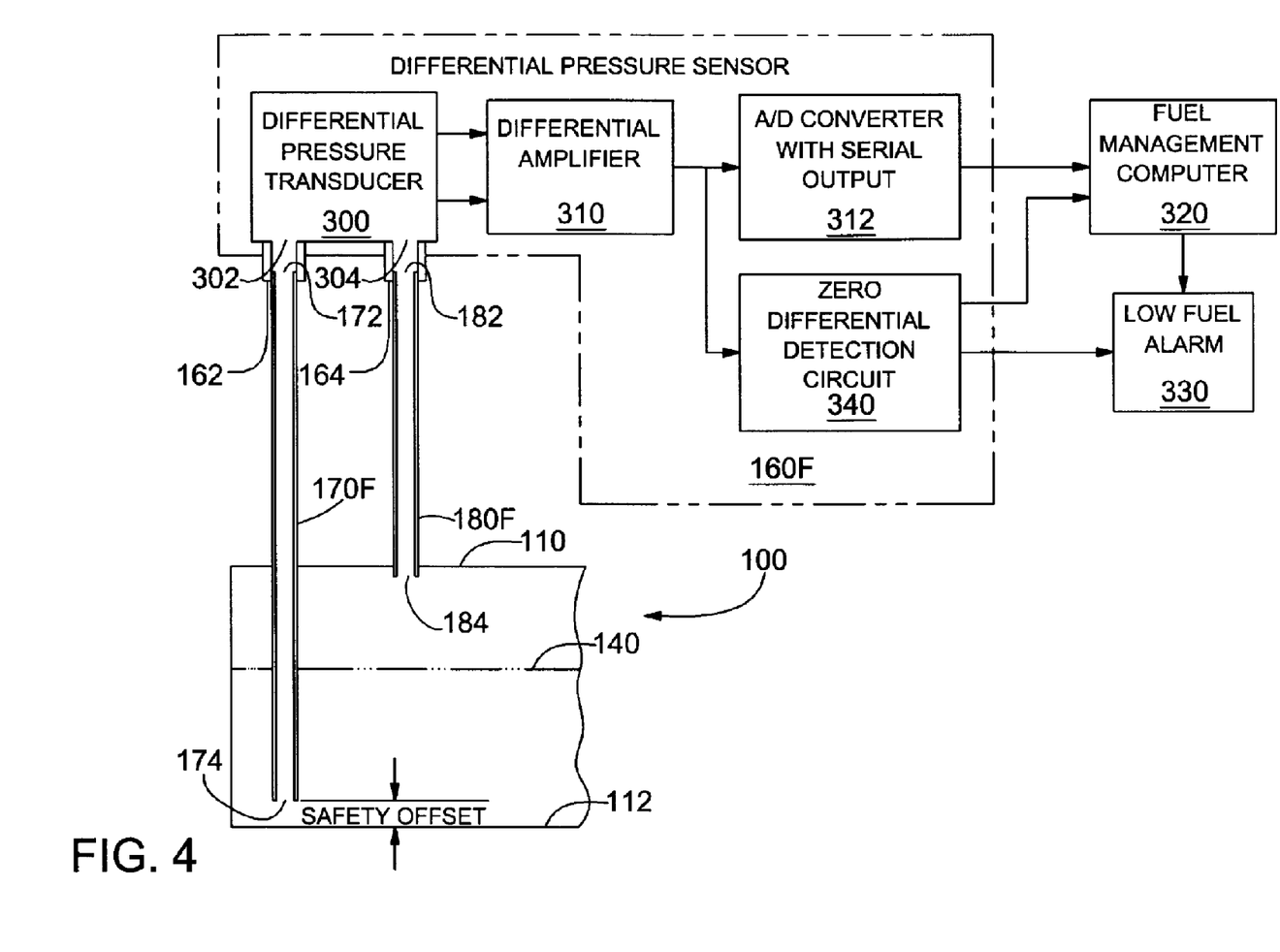
FIG. 4 illustrates a block diagram of an exemplary probe that further includes a low liquid level detection circuit.

As shown in FIG. 4, the corresponding differential pressure sensor 160F advantageously includes a zero-differential detection circuit 340, which is coupled to the output of the differential amplifier 310. The detection circuit 340 senses when the output of the differential amplifier 310 corresponds to a substantially zero pressure differential between the two tubes, which occurs with the second end 174 of the measurement tube 170F is exposed to the ullage 142. When the detection circuit 340 detects this condition, the detection circuit 340 generates an output signal that represents zero pressure. The output signal from the detection circuit 340 is advantageously provided to the fuel management computer 320 in addition to the digital pressure values. The fuel management computer 320 is advantageously configured to respond to the zero pressure indication and provide one or more indications to the operator of the aircraft (e.g., the pilot) to inform the operator that the liquid in the tank 100 is approaching empty. For example, the fuel management computer 320 may activate the low fuel warning alarm 330.

In particularly preferred embodiments, the sixth differential pressure sensor 160F is advantageously provided with a secondary source of electrical power so that the sixth sensor 160F continues to receive power even if the power provided to the other sensors 160A-E is interrupted. Additionally, the sixth sensor 160F advantageously provides a secondary output signal that is activated when the liquid level decreases below safety offset height shown in FIG. 1. For example, the secondary output signal is advantageously coupled to the low fuel alarm 330, which comprises one or more of a warning light, an audio warning device, or the like, to inform the operator of the aircraft of the low fuel condition even if the fuel management computer 320 malfunctions as a result of a power interruption or other fault.

Figure 2:
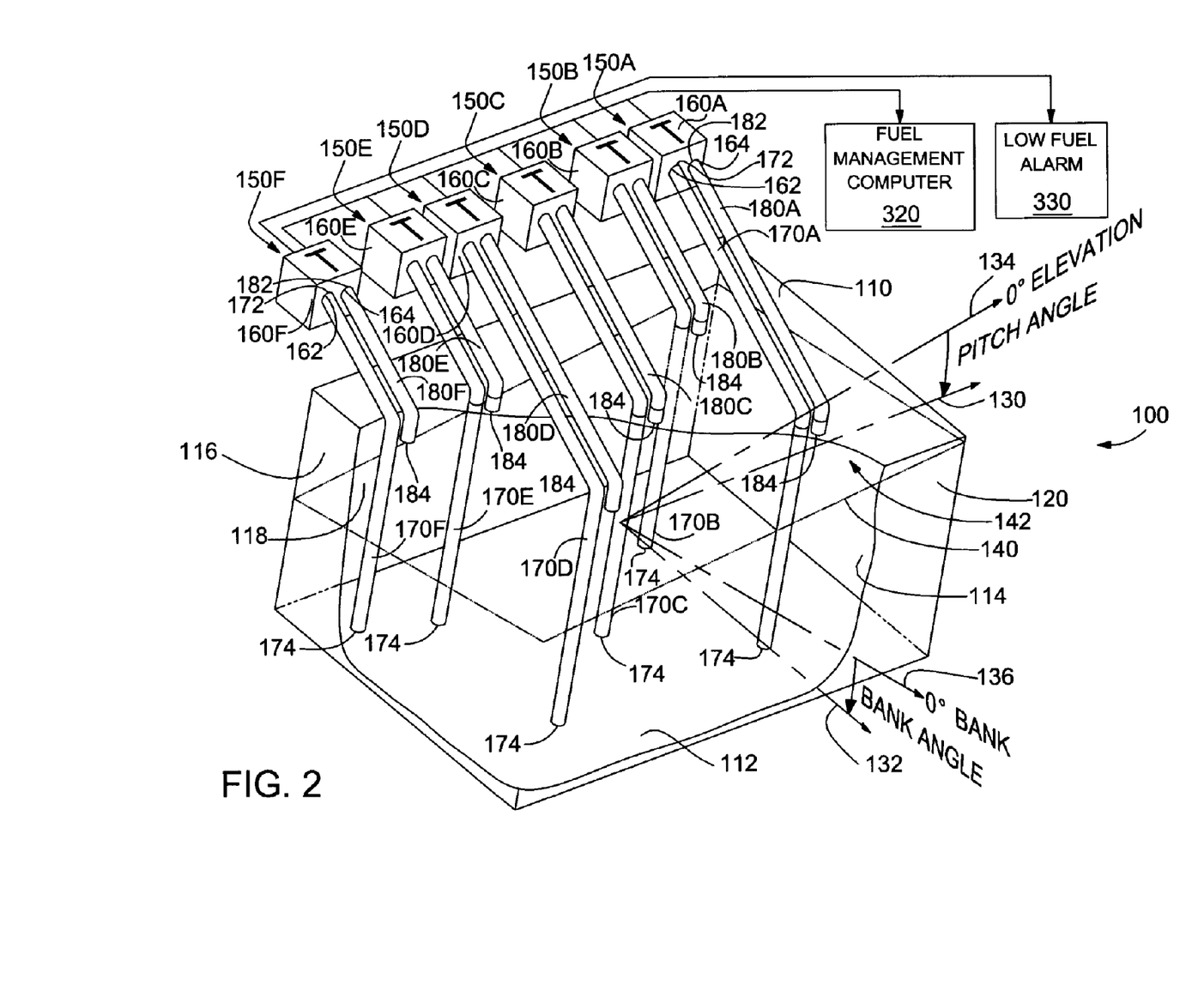
FIG. 2 illustrates the effect of elevation and bank on the liquid level above each probe.

When the attitude of the aircraft is changed so that the aircraft is no longer flying straight and level, the orientation of the tank 100 changes accordingly. For example, FIG. 2 illustrates the orientation of the tank 100 when the aircraft is descending and banking to the right. The 0° elevation line 134 and the 0° bank line 136 remain in a horizontal reference plane parallel to the earth's surface as in FIG. 1. Since the tank 100 is tilting forward and to the right, the first centerline 130 in FIG. 2 is not aligned with the 0° elevation line 134, and the second centerline 132 is not aligned with the 0° bank line 136. Rather, the first centerline 130 is offset below the 0° elevation line 134 by a pitch angle, and the second centerline 132 is offset below the 0° bank line 136 by a bank angle.

Assuming the aircraft is in a steady descent and bank, the liquid surface 140 remains level with respect to the earth's surface. Thus, the liquid surface 140 remains in a horizontal plane parallel to the plane defined by the 0° elevation line 134 and the 0° bank line 136. As a result, the depth of the liquid in the tank 100 varies within the tank 100. For example, the depth of the liquid at the forward, right corner 220 of the tank 100 is substantially increased over the liquid depth in the corresponding corner in FIG. 1. The liquid depth at the aft left corner 222 of the tank 100 is substantially decreased below the liquid depth in the corresponding corner of FIG. 1.

Since the liquid depth varies across the bottom surface 112 when the aircraft is not in a level flight attitude as shown in FIG. 2, the depth of the liquid above the measurement tube 170 of a single probe assembly 150 does not accurately represent the quantity of liquid in the tank 100. However, the pressure values from the first five probe assemblies 150A-E in FIGS. 1 and 2 are used to determine the liquid quantity. In particular, as illustrated by an activity block 510 in a flow diagram 500 in FIG. 5, the differential pressure transducers 300 in the probe assemblies 150A-F periodically sample the differential pressures at a selected sampling rate (e.g., one sample per second or per other suitable interval). In an activity block 520, the transducers 300 generate the digital representations of the measured pressures and output the values to the fuel management computer 320. In an activity block 530, the fuel management computer 320 receives and stores the digital pressure values. In an activity block 540, the fuel management computer 320 adjusts the pressure values to compensate for any differences in the shape of the tank 100, which may, for example, cause the respective second end 174 of the measurement tube 170 of certain probe asemblies 150 to be positioned at a different depths with respect to the liquid surface 140 even when the tank 100 is in the level condition shown in FIG. 1.

Figure 5:
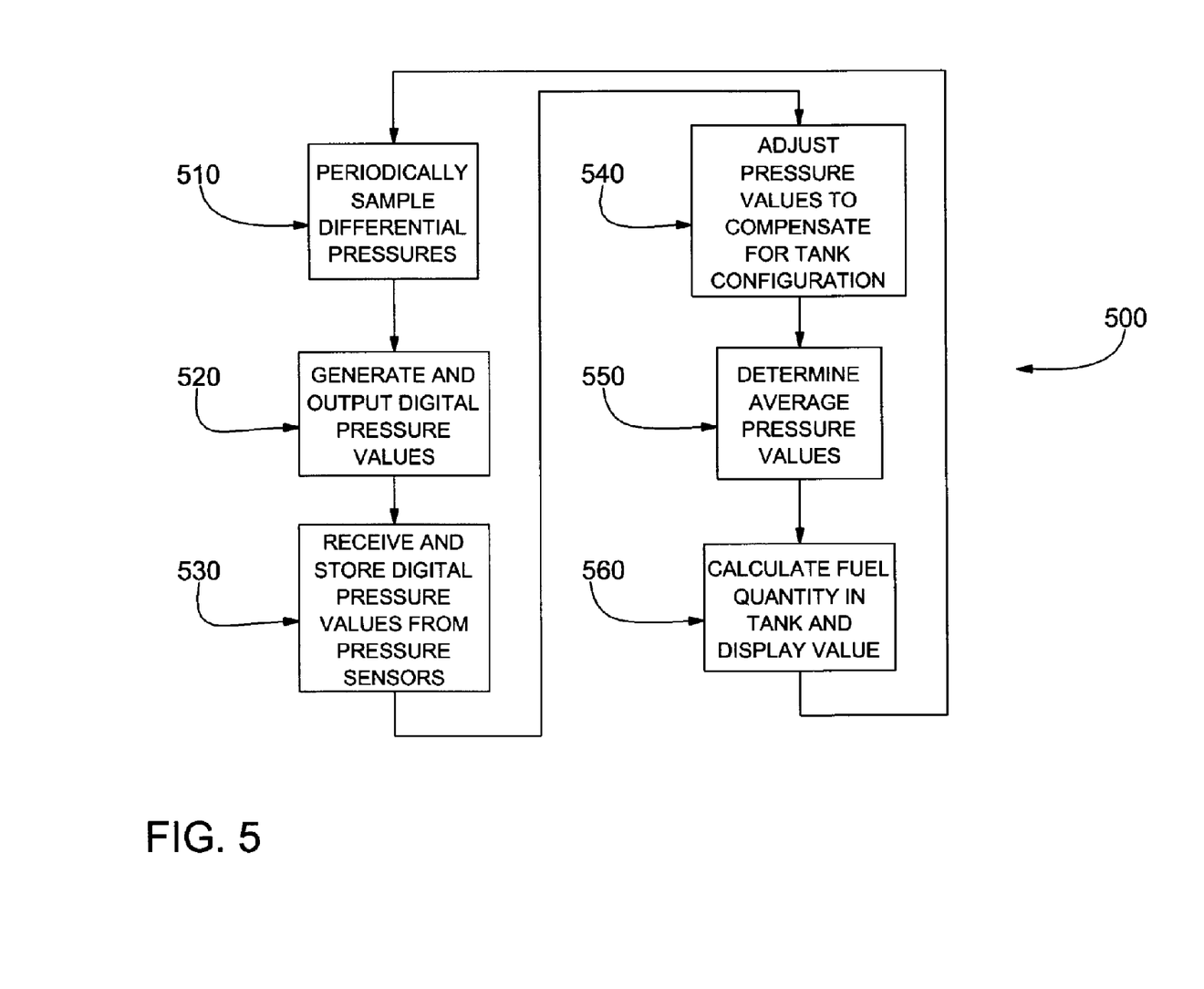
FIG. 5 illustrates a flow diagram of the operation of the fuel probes and the fuel management computer in the exemplary embodiment for measuring fuel remaining in a fuel tank.

After performing any needed compensation of the pressure values, the fuel management computer 320 uses the pressure values from the five probe assemblies 150A-E in an activity block 550 to obtain a value representing the total weight of the liquid remaining in the tank 100. The total weight may be calculated from the measured pressures. Alternatively, the pressure values may be used to index a lookup table or other stored data to determine a weight of liquid corresponding to the measured pressure values. In an activity block 560, the fuel management computer 320 calculates the quantity of liquid remaining in the tank 100 using the total weight determined in the block 550 and the density of the liquid, and displays a value that represents the liquid quantity.

Although described herein as a fuel management computer 320, the computer 320 is advantageously adaptable to the management of other liquids. The calculations performed in the block 560 are adjusted in accordance with the density of a particular liquid to determined the quantity of liquid in the tank 100

The differential probes described herein are relatively inexpensive and are highly accurate. In one advantageous embodiment, the combination of the accurate pressure sensors and the plurality of probes enables the system to determine the liquid weight within the tank 100 even when the tank 100 is tilted (e.g., the tank is in an aircraft that is banking). The measurement probes are lightweight and are constructed of materials that will not damage the tanks in the event of a crash or a hard landing. The differential probes are easily configured for different tank sizes. The differential probes work with all liquid types. Since the pressure measurements are differential and are determined by the weight of the liquid, the system does not require temperature compensation. The multiple probes compensate for the tilt angle of the tank. The probes are simple to install and easy to maintain and repair. Since no wiring in the tanks is required, the probes are immune to lightning and electromagnetic interference (EMI). Unlike a capacitive probe, the location of the electronics with respect to the tank does not affect the performance of the system.

One skilled in art will appreciate that the foregoing embodiments are illustrative of the present invention. The present invention can be advantageously incorporated into alternative embodiments while remaining within the spirit and scope of the present invention, as defined by the appended claims.

What is claimed is:

1. A system for measuring the weight of a liquid in a tank subject to tilting, comprising:
   a plurality of differential pressure transducers located outside the tank, each pressure transducer having a first pressure port and a second pressure port, each pressure transducer providing at least one output signal responsive to the pressures applied to the first pressure port and the second pressure port;
   a plurality of probes spaced apart in the tank at locations selected such that tilting of the tank causes a height of liquid at a first location of at least a first probe to increase and causes a height of liquid at a second location of at least a second probe to decrease, each probe comprising:
      a first tube having a first end located inside the tank proximate to the bottom of the tank and having a second end coupled to the first port of a respective one of the pressure transducers to communicate a pressure to the pressure transducer, the pressure caused by weight of liquid above the first end; and
      a second tube having a first end located inside the tank in the ullage above the level of liquid in the tank and having a second end coupled to the second port of the respective one the pressure transducers; and
      a processing system coupled to receive signals responsive to the output signals from the plurality of pressure transducers, the processing system calculating a quantity of liquid in the tank based on the respective weights of liquid above each of the plurality of probes.

2. The system for measuring the liquid in a tank as defined in claim 1, wherein the liquid comprises fuel supplying energy to an aircraft.

3. The system for measuring the liquid in a tank as defined in claim 1, wherein the tank is in an aircraft, and wherein the tank is tilted by changes in the attitude of the aircraft.

4. A system for measuring the weight of a liquid in a tank subject to tilting, comprising:
   a plurality of differential pressure transducers located outside the tank, each pressure transducer having a first pressure port and a second pressure port, each pressure transducer providing at least one output signal responsive to the pressures applied to the first pressure port and the second pressure port;
   a plurality of probes spaced apart in the tank, each probe comprising:
      a first tube having a first end located inside the tank proximate to the bottom of the tank and having a second end coupled to the first port of a respective one of the pressure transducers to communicate a pressure to the pressure transducer, the pressure caused by weight of liquid above the first end; and
      a second tube having a first end located inside the tank in the ullacie above the level of liquid in the tank and having a second end coupled to the second port of the respective one the pressure transducers;
   an additional pressure transducer having a first pressure port and a second pressure port, the additional pressure transducer providing at least one output signal responsive to the pressures applied to the first pressure port and the second pressure port; and
   an additional probe comprising a length of tubing having a first end located inside the tank and having a second end coupled to the first port of a respective one of the pressure transducers to communicate a pressure to the pressure transducer, the pressure caused by weight of liquid above the probe, the first end of the additional probe being located at a selected distance above the bottom of the tank such that the first end of the additional probe is exposed to the ullage when the level of the liquid in the tank decreases below the selected distance; and
   a processing system coupled to receive signals responsive to the output signals from the plurality of pressure transducers, the processing system calculating a quantity of liquid in the tank based on the respective weights of liquid above each of the plurality of probes, the processing system responsive to the output signal from the additional transducer to produce an indication that the liquid level in the tank is low.

5. A method of measuring the liquid in a tank subject to tilting, comprising:
   positioning a plurality of differential pressure transducers outside the tank, each pressure transducer having a first pressure port and a second pressure port;
   positioning a plurality of measurement probes in the tank with a first end of each measurement probe proximate to the bottom of the tank and spaced apart in the tank at locations selected such that tilting of the tank causes a height of liquid at a first location of at least a first probe to increase and causes a height of liquid at a second location of at least a second probe to decrease;
   communicating pressures to the first pressure ports of the pressure transducers from the first ends of the measurement probes, the pressures caused by weight of liquid above the first ends of the measurement probes;
   positioning a plurality of reference probes in the ullage above the level of liquid in the tank;
   communicating pressures from the reference probes to the second pressure ports of the pressure transducers; and
   processing data responsive to the output signals from the plurality of pressure transducers to calculate a quantity of liquid in the tank based on the respective weights of liquid above each of the plurality of measurement probes.

6. A system for measuring the weight of a liquid in a tank subject to tilting, comprising:
   a plurality of differential pressure transducers located outside the tank, each pressure transducer having a first pressure port and a second pressure port, each pressure transducer providing at least one output signal responsive to the pressures applied to the first pressure port and the second pressure port;
   a plurality of measurement tubes spaced apart in the tank at locations selected such that tilting of the tank causes a height of liquid at a first location of at least a first probe to increase and causes a height of liquid at a second location of at least a second probe to decrease, each measurement tube having a first end located inside the tank proximate to the bottom of the tank and having a second end coupled to the first port of a respective one of the pressure transducers to communicate a pressure to the pressure transducer, the pressure caused by weight of liquid above the first end;
   at least one reference tube having a first end located inside the tank in the ullage above the level of liquid in the tank and having a second end coupled to the second port of at least one of the pressure transducers to communicate a pressure in the ullage of the tank; and a processing system coupled to receive signals responsive to the output signals from the plurality of pressure transducers, the processing system calculating a quantity of liquid in the tank based on the pressures caused by the respective weights of liquid above the respective second ends of the plurality of measurement tubes.

* * * * *

UNITED STATES PATENT AND TRADEMARK OFFICE
CERTIFICATE OF CORRECTION

PATENT NO.         : 7,251,998 B2                                                              Page 1 of 1
APPLICATION NO.    : 10/908768
DATED              : August 7, 2007
INVENTOR(S)        : Robert D. Gourlay, Steven C. Williams and Daniel L. Pagan It is certified that error appears in the above-identified patent and that said Letters Patent is hereby corrected as shown below:

On the title page, in section (73), please delete "BAE Systems Information and Electronic Systems Integration Inc." and insert therefor --BAE Systems Aircraft Controls Inc.--

Signed and Sealed this

Twenty-first Day of September, 2010

David J. Kappos
*Director of the United States Patent and Trademark Office*